June 8, 1926.
M. D. CAMPBELL
INSECT CATCHER
Filed May 29, 1925
1,587,898
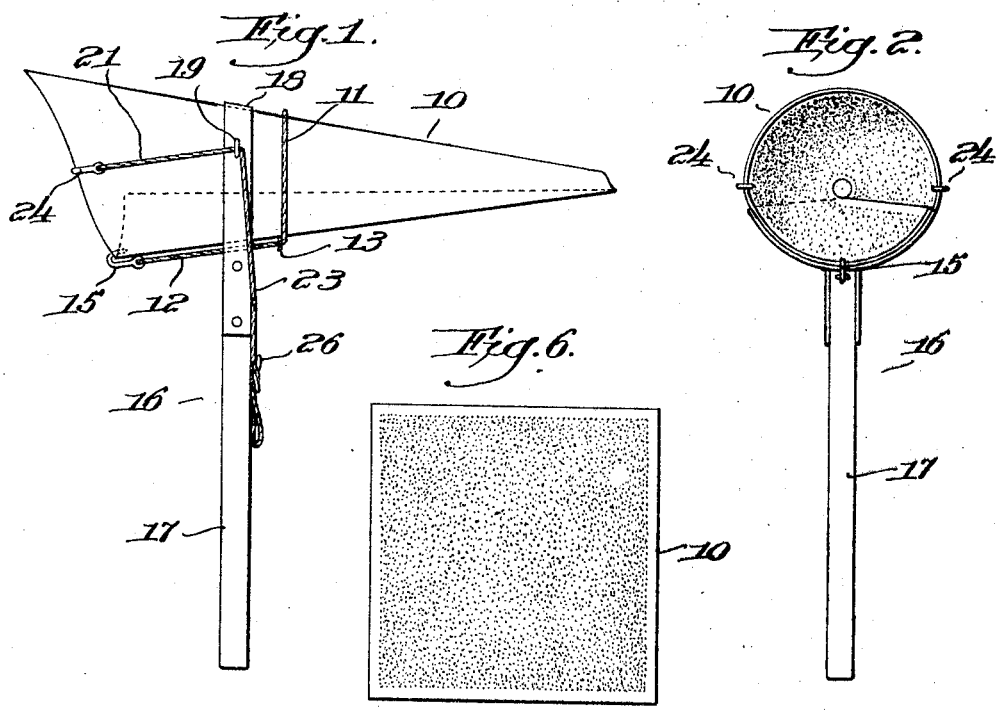
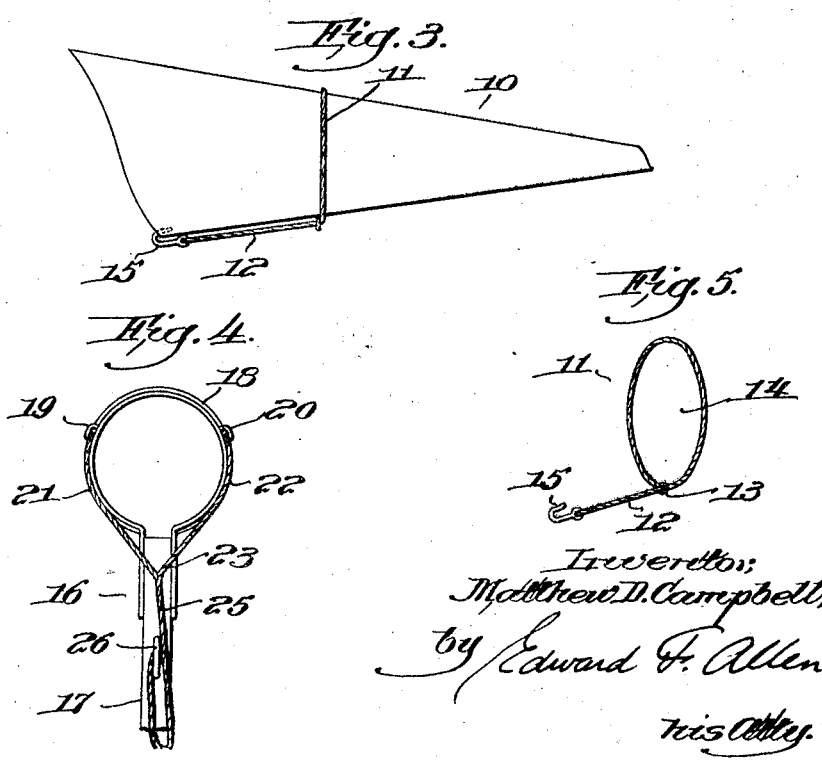

Patented June 8, 1926.

1,587,898

UNITED STATES PATENT OFFICE.

MATTHEW D. CAMPBELL, OF ROXBURY, MASSACHUSETTS.

INSECT CATCHER.

Application filed May 29, 1925. Serial No. 33,806.

This invention relates to an insect catcher, and more particularly to one that is manually operable.

An object of the invention is to produce a manually operable insect catcher that is simple in structure, and wherein a preferably heavy, sticky insect or fly paper or card board, rolled to form a cone open at both ends, is mounted thereon, and arranged to be replaced by another when it has been used to its limit.

Another object of the invention is to provide means to retain the paper or card board in the form of a cone, and so arrange the said means that the cone may be used as a catcher independently of a handle or frame if desired.

Other objects of the invention will be fully understood from a description of the drawings and the claims hereinafter given.

Of the drawings:

Figure 1 represents a side view of the insect catcher ready for use.

Figure 2 is a view looking toward the right Figure 1.

Figure 3 is a view of the cone removed from the frame.

Figure 4 is a view of the upper portion of the frame looking toward the left Figure 1.

Figure 5 is a perspective view of the means to retain the cone in shape.

Figure 6 is a plan view on a reduced scale of a sheet of heavy gummed paper prior to rolling it into cone shape.

Like characters represent like parts throughout the several figures of the drawings.

Referring to the drawings:

The gummed or sticky paper or card board 10 shown herein as a square piece, see Figure 6, may be of stock, and any shape best suited to form a cone when rolled, and when shaped a retaining device 11 is applied thereto preparatory to mounting the cone in a frame to be referred to.

The retaining device consists of a piece of flexible wire or cord 12 having an eye 13 at one end thereof through which the cord is passed to form a loop 14, and having a hook 15 at the other end.

When the paper has been rolled to form a cone, the small end thereof will be passed through the loop 14 and the hook engaged with the lapped edges of the paper as seen in Figures 1 to 3 inclusive in which position the cone cannot unroll and the device cannot slip off.

When the cone has been formed and secured by the retaining device, it may be mounted on the frame 16 which comprises a handle 17 having at its outer end a thin hoop or band 18 which forms a seat for the cone.

The band has eyes 19 and 20 thereon through which the ends 21 and 22 of a bridle 23 pass, the said ends each having a hook 24 fast therewith, the said hooks being arranged to engage the edge of the cone at the mouth or large end thereof.

The said bridle 23 has an end 25 preferably secured to the handle 17 in such manner as to prevent separation of the two, and arranged to be again secured to the said handle, when the cone is in place, by engagement with the cleat 26.

From the foregoing it will be readily seen that the cone is held in shape by the retaining device 11, and firmly held to the frame 16 by the bridle 23.

Having described the invention I claim:

1. An insect catcher comprising a frame; a made up cone of heavy gummed paper having portions thereof overlapping, said cone being held in shape by a retaining device comprising a girdle having a hook arranged to engage the overlapped portion of the cone at the mouth thereof; and flexible means arranged to secure said cone to said frame.

2. An insect catcher comprising a frame; a made up cone of heavy gummed paper, said frame providing a seat for said cone; and flexible adjustable means coacting with said cone and said frame to hold said cone to said seat.

3. An insect catcher comprising a cone made up of heavy gummed paper; a frame having a seat for said cone and a shape retaining device for said cone comprising a cone encircling part arranged to be adjusted to said cone prior to adjusting said cone to said seat; and means to retain said cone in said seat and a mouth engaging part.

4. An insect catcher comprising a cone made up of gummed paper; a frame in which said cone may be seated; and flexible adjustable means arranged to engage the mouth of said cone and to be secured to said frame to secure said cone to said frame.

5. An insect catcher comprising a cone made up of heavy fly paper; a frame in which said cone may be seated; a bridle arranged to retain said cone in said frame and comprising hooks to engage the mouth of said cone and a flexible end arranged to be secured to said frame.

Signed by me at Boston, Massachusetts, this 27th day of May, 1925.

MATTHEW D. CAMPBELL.